United States Patent [19]

Saperstein et al.

[11] Patent Number: 5,265,437
[45] Date of Patent: Nov. 30, 1993

[54] AUTOMOTIVE REFRIGERATION SYSTEM REQUIRING MINIMAL REFRIGERANT

[75] Inventors: Zalman P. Saperstein, Lake Bluff, Ill.; Charles J. Rogers, Racine, Wis.

[73] Assignee: Modine Manufacturing Co., Racine, Wis.

[21] Appl. No.: 745,514

[22] Filed: Aug. 15, 1991

Related U.S. Application Data

[63] Continuation-in-part of Ser. No. 617,600, Nov. 26, 1990.

[51] Int. Cl.[5] ............................................. F25B 1/00
[52] U.S. Cl. ........................................ 62/243; 62/435; 62/498
[58] Field of Search ............... 62/435, 506, 498, 499, 62/243

[56] References Cited

U.S. PATENT DOCUMENTS

| | | | |
|---|---|---|---|
| 1,352,533 | 9/1920 | Ross | 62/506 X |
| 2,336,089 | 12/1943 | Gould | 62/244 |
| 2,761,293 | 9/1956 | Eubank | 62/434 |
| 2,806,358 | 9/1957 | Jacobs | 62/243 |

*Primary Examiner*—William E. Wayner
*Attorney, Agent, or Firm*—Wood, Phillips, VanSanten, Hoffman & Ertel

[57] ABSTRACT

The potential for leakage of CFCs, HCFCs, HFCs and HCs to the atmosphere as a result of leakage in vehicular refrigeration systems is reduced by employing conduits (42, 58 and 63) of relatively short length to interconnect closely grouped system components including a compressor (38), a condenser (44) and an evaporator (62). The condenser (44) includes a liquid flow path (46) in heat exchange relation with a refrigerant flow path (48) and the same is connected by conduit (52) to heat exchanger (36). The evaporator (62) also includes a liquid flow path (65) in heat exchange relation with a refrigerant flow path (60) and the same is connected by conduits (66, 67) to at least one heat exchanger (68, 69) remote from an engine compartment (22) in which the compressor (38), condenser (44) and evaporator (62) are housed. The close proximity of the components minimizes the charge of refrigerant required and thus reduces the amount of refrigerant that may potentially leak from the system.

2 Claims, 1 Drawing Sheet

AUTOMOTIVE REFRIGERATION SYSTEM REQUIRING MINIMAL REFRIGERANT

CROSS-REFERENCE

This application is a continuation-in-part of U.S. patent application Ser. No. 617,600, filed Nov. 26, 1990.

FIELD OF THE INVENTION

This invention relates to automotive refrigeration systems such as systems for air-conditioning passenger compartments in vehicles and/or providing for the cooling of cargo carried by the vehicle.

BACKGROUND OF THE INVENTION

Recent years have seen increasing concern about the effects of the discharge of chloro fluoro carbons (CFCs) and related compounds such as hydro fluoro carbons (HFCs) and hydro chloro fluoro carbons (HCFCs) into the atmosphere. Scientists have determined that CFCs and, to a lesser extent, HCFCs break down the ozone layer at the perimeter of the earth's atmosphere. The ozone layer in turn has long provided a screening effect for screening out ultraviolet light emanating principally from the sun.

It is feared that continued break down of the ozone layer will result in increasing amounts of ultraviolet energy reaching the earth's surface rather than being screened from the surface by the ozone layer and that the increase in ultraviolet light striking the surface will cause an increased incidence of various types of skin cancers. Consequently, every use of CFCs is in the process of being re-evaluated to determine suitable alternates that will not cause break down of the ozone layer. For example, CFCs have long been used as propellants in aerosol containers. Their use in such containers has been substantially halted in recent years in favor of other compounds.

CFCs and HCFCs have also been widely used as refrigerants in refrigeration systems of all sorts. And, of course, when these refrigerants escape the closed loops found in such refrigeration systems, they pose the same danger to the ozone layer as propellants released from aerosol containers. And while, as alluded to previously, HCFCs do not have as deleterious effect on the ozone layer as CFCs, they do promote atmospheric changes that may result in global warming, that is, the so-called greenhouse effect. Similarly, HFCs, which have also been used in refrigeration systems as refrigerants tend to promote global warming when released into the atmosphere, although they do not noticeably contribute to the destruction of the ozone layer. Other compounds that have the ability to serve as refrigerants as, for example, hydrocarbons (HCs) of low molecular weight do not pose dangers to the ozone layer or raise the potential for global warming. However, they are highly combustible such that release to the atmosphere in areas of potential fire or explosion danger cannot be tolerated.

While many refrigeration systems are not at all prone to leak refrigerants to the atmosphere or ambient, those used in connection with vehicles are relatively leak prone. During operation of the vehicle, the refrigeration system, whether used for cooling cargo or whether utilized for cooling a passenger compartment, or both is subject to substantial vibration as the vehicle traverses the underlying terrain. Since fittings are required to connect the various components to one another, the possibility of leakage through such fittings as a result of vibration during operation of the vehicle is substantial.

Moreover, since the compressors in vehicular refrigeration systems, particularly air-conditioning systems, are typically engine driven, they are mounted rigidly to the engine and will move with the engine as the same shifts on its mounts as a result of various torque requirements and changes in loading as well as engine speed and acceleration or deceleration conditions. At the same time, the condenser and the evaporator in such systems are fixed to the vehicle frame and thus do not move with the engine as it shifts on its mounts.

Relative movement between the compressor on the one hand and the condenser and evaporator on the other is thus taken up in conduits and interconnecting fittings; and this relative movement in turn is also prone to cause leakage over a period of time.

Finally, the seals used in such systems frequently employ elastomers in order to accommodate vibration and relative movement between system components. Over a period of time, such seals may tend to shrink if not subjected to the refrigerant and/or lubricant within the refrigerant at periodic intervals. Thus, automobile manufacturers frequently suggest that air conditioning systems be cycled for several minutes at least once a month even during the winter months to prevent loss of the refrigerant charge. If, however, the operator of the vehicle does not attend to such cycling, ultimately discharge of part or all of the refrigerant charge may occur through shrunken seals and where the refrigerant charge is the CFC R12, which is highly destructive of the ozone and which is the most commonly used refrigerant in automotive refrigeration systems, the problem is exacerbated.

The present invention is directed to minimizing the effects of undesirable leakage of refrigerants to the atmosphere. In particular, it is directed to minimizing the effects of leakage of CFCs, HCFCs and HFCs to the atmosphere when the same are used as refrigerants and is also directed to providing a refrigerant utilizing system that may advantageously employ HCs without generating a potential fire or explosion hazard to persons benefiting from the refrigeration system.

SUMMARY OF THE INVENTION

It is the principal object of the invention to provide a new and improved refrigeration system for a vehicle. More particularly, it is an object of the invention to provide a refrigeration system for a vehicle that requires a minimum charge of a refrigerant such as CFC, HCFC, HFC or HC refrigerants so that if the system were to leak, the amount of the refrigerant discharged to the atmosphere through the leak would be considerably reduced over that discharged by a leaking, conventional system.

The refrigeration system made according to the invention employs a system similar to that disclosed in U.S. patent application Ser. No. 617,600; although an additional liquid heat exchanger circuit has been added to cool the condenser. This added circuit further reduces the amount of refrigerant required for the system.

According to one facet of the invention, the foregoing object is realized in a vehicle having an engine compartment and at least one passenger or cargo compartment. According to the invention, there is provided a refrigerant compressor for CFCs, HFCs, HCFCs or HCs in the engine compartment, a refrigerant condenser for CFCs, HFCs, HCFCs and HCs in close proximity to the compressor and an evaporator within the engine compartment in close proximity to both the compressor and the condenser. The evaporator and the condenser each have a refrigerant flow path and a liquid flow path in heat exchange relation therewith. Conduit means interconnect the compressor and the condenser and evaporator refrigerant flow paths to define a closed refrigerant loop. This loop, in turn, includes at least one fitting and is subject to CFC, HFC, HCFC or HC leakage to the ambient. According to the invention, the proximity of the compressor and the condenser and evaporator refrigerant flow paths is such as to minimize the volume of CFC, HFC, HCFC or HC refrigerant in the conduit means so that in the event of refrigerant leakage through the fitting or fittings, discharge of CFC, HFC, HCFC or HC to the atmosphere will be minimized. A first heat exchanger is operatively associated with the passenger or cargo compartment to cool the same and circulating means are provided for circulating a liquid cooled in the evaporator liquid flow path to this heat exchanger for cooling the passenger or cargo compartment. The cooled liquid could also be used to cool engine oil, transmission oil, or an intercooler. A second heat exchanger is located in the ambient air stream and used to cool liquid circulated to the condenser. Circulating means are provided for circulating the cooled liquid through the second heat exchanger for cooling the condenser.

The invention contemplates that the vehicle include a vehicle frame together with ground engaging means for supporting the vehicle above the underlying terrain and for propelling the vehicle over the same. An engine is mounted on the frame within the engine compartment for providing vehicle propulsion and is also adapted to provide power to operate accessories. The compressor is located within the engine compartment and is connected to the engine to be driven thereby. Alternatively, the compressor may be located remotely from the passenger or cargo component and driven by a motor energized by the electrical system of the vehicle.

The conduits interconnecting the condenser, evaporator and compressor are relatively short and are of minimal volume because of the proximity of the compressor, condenser and evaporator to each other while conduits employed in the circulating means for connecting the evaporator to the first and second heat exchangers are long in relation to the conduits connecting the condenser, compressor and evaporator together to thereby facilitate the use of short conduits thereat and yet provide a means for communicating a cooled heat exchange fluid to two separate remotely located heat exchangers for cooling the passenger or cargo compartments and for cooling the condenser. In one embodiment of the invention, there are two passenger or cargo compartments and two compartment heat exchangers, one for each of the compartments. In another embodiment, the cooled heat exchange fluid is used to cool engine oil, transmission oil or the turbocharger intercooler. The circulating means includes means for selectively connecting the evaporator liquid flow path to either of the heat exchangers to selectively cool either one of the heat exchangers.

In a highly preferred embodiment, the passenger or cargo compartments are both passenger compartments. One is an operator compartment from which the vehicle may be operated and the other is a sleeping compartment in which a passenger may rest.

According to another facet of the invention, there is provided a method of minimizing the discharge of CFCs, HFCs, HCFCs or HCs to the ambient by a vehicular refrigeration system having a closed refrigerant loop with at least one fitting and capable of leaking and interconnecting an engine or motor driven compressor, a condenser and an evaporator. The method includes the steps of:

a) grouping the compressor, condenser and evaporator in close proximity to each other either within the engine compartment or at a location spaced from the passenger or cargo compartment so as to minimize the length of conduits interconnecting the same;

b) placing a first air-liquid heat exchanger in a passenger or cargo compartment which is isolated from the engine compartment or the location of the compressor, condenser and evaporator;

c) connecting the first heat exchanger in a flow path for circulating liquid which extends into the engine compartment or the location of the compressor, condenser and evaporator and which is in heat transfer relation with the evaporator; and d) connecting a second air-liquid heat exchanger in a flow path for circulating liquid which is in a heat transfer relation with the condenser and locating the same in an ambient air stream;

e) whereby the refrigerant charge is minimized to thereby reduce potential CFC, HFC, HCFC or HC leakage to the ambient.

Other objects and advantages will become apparent from the following specification taken in connection with the accompanying drawings.

DESCRIPTION OF THE PREFERRED EMBODIMENT

Figure 1:
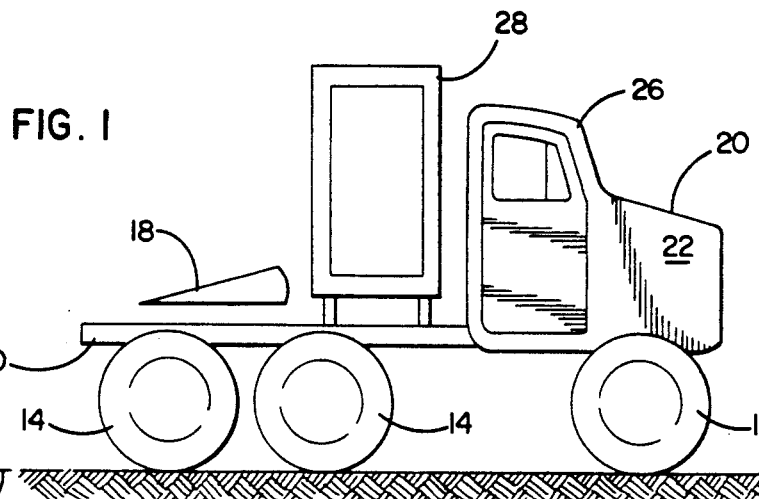
FIG. 1 is a side elevation of a vehicle embodying the invention.

An exemplary embodiment of a vehicle in which a refrigeration system made according to the invention may be employed is illustrated in FIG. 1 in the form of a tractor for pulling one or more trailers. However, it is to be understood that the invention may be utilized with efficacy in other vehicles such as automobiles, farm tractors, off-the-road haulers and various forms of construction equipment. In the embodiment illustrated, the vehicle includes a frame 10 mounting front wheels 12 for conventional steering purposes and rear wheels 14 for propulsion purposes. The wheels 12 and 14 engage underlying terrain 16 to support the vehicle.

Near its rear end, the frame 10 mounts a conventional so-called "fifth wheel" 18 for connection to a trailer. At its forward end, the vehicle includes a hood 20 enclosing an engine compartment 22. Just rearwardly of the engine compartment is a cab or passenger compartment 26 which may house the operator of the vehicle and any passengers.

To the rear of the cab 26 is a separate, sleeping compartment 28, although the same could be utilized for the purpose of carrying cargo if desired.

Within the engine compartment 22, an engine 30 (FIG. 2) is mounted on the frame 10 by any suitable means and is conventionally mechanically coupled to the rear wheels 14 to provide propulsion for the vehicle. Just forwardly of the engine is a fan 32 which may be driven by the engine itself or by an electric motor powered by the electrical system of the vehicle. Immediately forwardly of the fan 32 is a radiator 34 for cooling engine coolant and just forwardly of the radiator 34 is an air-condenser cooling liquid heat exchanger 36 which is part of a cooling system made according to the invention and employing a liquid with a high heat capacity such as a glycol-water mixture having a low freezing point.

Mounted on the engine within the engine compartment near its forward end to be conventionally driven as by a belt or the like is a refrigeration system compressor 38 for compressing a CFC, HCFC, HFC or HC refrigerant. The compressor 38 is intended to receive refrigerant vapor at an inlet 40 and discharge the same at elevated pressure into a compressor outlet refrigerant conduit 42 which extends to a condenser 44. This condenser 44 is not a typical automotive air cooled condenser located forward of the radiator, but a liquid cooled condenser that is located closely adjacent the compressor 38. The condenser 44 contains a condenser liquid flow path 46 in heat exchange relation to a condenser refrigerant flow path 48, also within the condenser 44 itself. Fittings connecting the conduit 42 between the compressor 38 and the condenser 44 are shown somewhat schematically at 50 and will be of the conventional sort employed in vehicular refrigeration systems. Thus, the same are subject to leakage as is well known. Other leakage-prone fittings (not shown) such as a sight glass, fill plug or the like will also typically be present and in fluid communication with the refrigerant loop. Indeed, leakage may occur at other non-fitting locations in the refrigerant loop as well, due to faults in castings, seals, conduits, etc.

In order to provide sufficient quantity of cool liquid to cool the condenser 44, a condenser cooling liquid conduit 52 extends from the liquid flow path 46 to the air liquid heat exchanger 36 located in front of radiator 34. The cooled liquid from the heat exchanger 36 flows via a return conduit 54 with aid of a pump 56 to condenser liquid flow path 46.

A refrigerant conduit 58 extends from the fitting 50 on the condenser 44 to an refrigerant flow path 60 within a refrigerant/liquid evaporator 62. The flow path 60 will conventionally include an expansion valve or a capillary, neither of which is shown, so that condensed CFC, HCFC, HFC or HC refrigerant received from the condenser 44 will expand within the flow path 60 to provide cooling.

The flow path 60 is in turn connected via an outlet conduit 63, secured as by fittings 50, to the inlet to the compressor 38.

An important feature of the invention is that the compressor 38, the condenser 44 and the evaporator 62 are all grouped in close proximity to one another within the engine compartment, that is, forwardly of a conventional fire wall 64 isolating the cab 26 from the engine compartment 22. To this end, the evaporator 62 may be located at the forward end of the engine 30 on the opposite side from the compressor 38. However, it will be appreciated that the actual positioning in any given vehicle will vary depending upon other constraints such as engine size, the degree to which the engine compartment is filled by the engine and other accessories, etc. That is to say that some or all of the three enumerated components could be mounted outside of the engine compartment so long as they are placed in close proximity to one another. Thus, where the compressor 38 is located remote from the engine 30 an electrical motor energized by the vehicle electrical system may be used to power the compressor 38.

When all of these constraints are taken into account, the invention contemplates that the grouping be such that the length of the refrigerant conduits 42, 58 and 63 be as short as possible. This will have the effect of minimizing the CFC, HFC, HCFC or HC refrigerant receiving volume of the system. Of course, cross sectional area of the passages of the conduits will also have an effect on such volume, but they may be conventionally selected according to the usual constraints considering the flow rates involved as well as whether the refrigerant is in a vapor or liquid phase, etc. Similarly, the internal volumes of the compressor 38, the condenser 44 and the refrigerant flow path 60 within the evaporator 62 will also be dictated by conventional considerations.

In any event, it will be appreciated that by minimizing the length of the conduits and thereby reducing the charge of refrigerant within the system, should leakage occur at any of the fittings 50 or even as a result of leakage at some other point, the amount of CFC, HCFC, HFC or HC that may be potentially discharged to the ambient or atmosphere as a result of such leakage is minimized.

At the same time, it is necessary to provide a cooled heat exchange fluid to the cab 26 and/or the compartment 28. To this end, the evaporator 62 includes a liquid flow path 65 in heat exchange relation with the refrigerant flow path 60 within the evaporator 62 itself. Conduits 66 and 67, respectively, extend from opposite ends of the liquid flow path 65 through the fire wall 64 and are adapted to convey a liquid with a high heat capacity from the engine compartment to one or the other of cab or cargo air-liquid heat exchangers 68 and 69, respectively, located in the cab 26 and the cargo or sleeping area 28. Typically, the liquid employed may be a glycol-water mixture having a low freezing point.

Ganged valves 70 in the lines 66 and 67 may be manually and selectively operated to direct the liquid to a liquid flow path 72 within the heat exchanger 68 or to a liquid flow path 74 within the heat exchanger 69. Both of the heat exchangers 68 and 69 include motor driven fans 76 for forcing air through an air flow path into heat exchange relation with the corresponding liquid flow path 72 or 74 and out of a cooled air outlet 77 or 78 for the heat exchangers 68 and 69, respectively.

Conventional temperature control systems may be employed as desired to control such operational parameters as the engagement or disengagement of the compressor 38 from the engine 30, circulation of the liquid between the evaporator 62 and the heat exchanger 68 or the heat exchanger 69 as a result of operation of a pump 80 in the conduit 67 and/or the speed of the fans 76.

Figure 2:
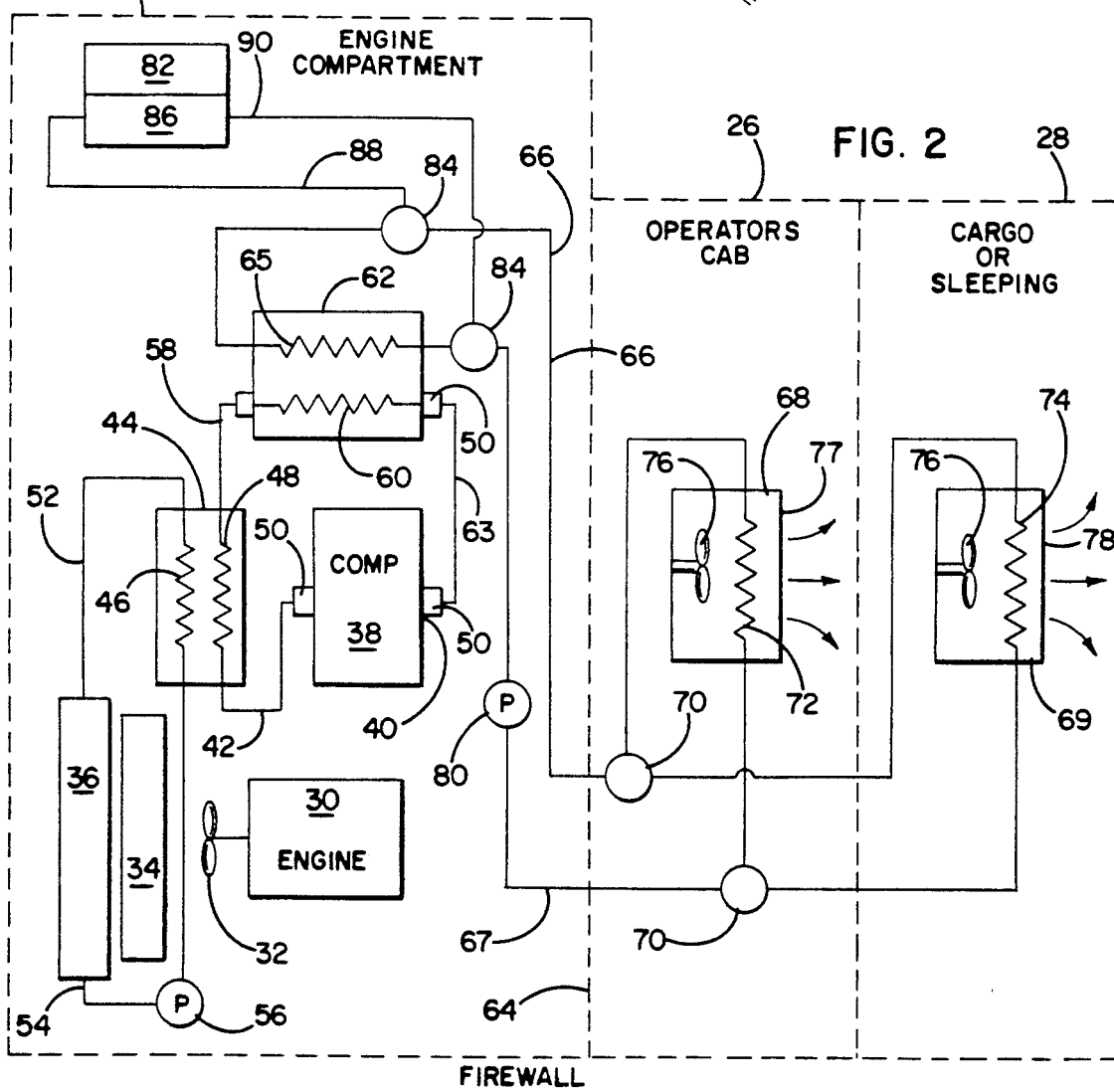
FIG. 2 is a schematic of one embodiment of the invention.

Even though FIG. 2 is a schematic, it can be readily appreciated that the length of the conduits 66 and 67 extending from the evaporator 62 to the valves 70 and either one of the heat exchangers 68 or 69 is quite long relative to the length of the rather short conduits 42, 58 and 63 coupling the compressor 38, the condenser 44 and the evaporator 62 because of the close proximity of these components to one another. This characteristic, of course, allows the latter conduits to be relatively short. When a liquid cooled condenser which, unlike conventional air cooled condensers, may be placed anywhere in the engine compartment is utilized even further reductions in the refrigerant flow paths are possible. Air cooled condensers must be located forward of the engine and require relatively long refrigerant lines from and to the compressor. The location of the compressor, since it is engine driven, is restricted to a position near the front of the engine. This in turn means that to minimize the length of the CFC, HCFC, HFC or HC containing conduits, the compressor 38 and evaporator 62 must also be located well forwardly of the fire wall 64. Thus, the conduits 66 and 67 will be relatively long.

It will also be appreciated that the invention provides a means of selectively cooling a plurality of compartments through selective operation of the valves 70. For example, in a highly preferred embodiment, where the cab 26 is an operator's cab and the compartment 28 provides sleeping quarters for the operator or a passenger or relief driver, energy requirements for the system may be minimized simply by cooling only the occupied compartments. Thus, if only the cab 26 is occupied, the valves 70 may be placed in a condition so that only the heat exchanger 76 receives cooled liquid from the evaporator 62. Conversely, if only the sleeping compartment 28 is occupied, then the valves 70 may be configured so that only the heat exchanger 69 is receiving cooled fluid. And, of course, if the cab 26 is being occupied by an operator and a relief driver is resting in the sleeping compartment 28, the valves 70 may be configured to provide cooling fluid to both the heat exchangers 68 and 69. If desired, additional compartments could similarly be cooled.

The cooling fluid can also be used to cool a fluid in an exothermic mechanical device, shown schematically at 82, in the vehicle. In particular, a fluid, such as a transmission oil, engine oil or turbocharger intercooler fluid, has not always been effectively cooled by typical air/-liquid heat exchangers because of their inadequate air flow due to a lack of frontal air exposure.

Ganged valves 84 in line 66 and 67 may be manually or selectively operated to direct the liquid to any number of auxiliary liquid-liquid heat exchangers 86 for cooling the device 82 containing the desired fluid via inlet and outlet auxiliary liquid conduits 88 and 90, respectively.

From the foregoing, it will be appreciated that the invention provides a means of minimizing the potential leakage of CFC, HFC, HCFC and HC refrigerants from a vehicle contained refrigeration system to the atmosphere. The system is relatively simple and provides the additional advantage of energy cost savings where more than one compartment is to be cooled and where the compartments are selectively used.

The improvement disclosed herein whereby a standard air cooled automotive condenser is replaced by a liquid cooled condenser adds additional flexibility to the possible location of the condenser, thereby reducing further the length of the refrigerant conduits and the total volume of refrigerant used.

Presently, typical automotive type engine cooling systems containing liquid coolants, such as glycol, have radiator coolant outlet temperatures that exceed the temperature of air conditioning refrigerant condensers, precluding the use of a common engine radiator and condenser heat exchanger. When engine coolant systems are developed that provide greater thermal efficiency and permit radiator outlet temperature to be lower than condensing temperature or when refrigerants are used that have significantly higher condensing temperatures than current radiator coolant outlet temperatures, the use of a common heat exchanger for cooling both engine coolant and condenser coolant would be a preferred embodiment.

The invention also contemplates other variations. For example, a liquid-air charge air cooler may have its liquid side located in the condenser liquid coolant loop and thereby use the heat exchanger 36 to no only provide a cooled liquid for cooling the refrigerant, but for cooling engine combustion air as well as it passes from a turbocharger or a supercharger to the engine 30.

A further benefit occurs as a result of the complete isolation of the refrigeration components from passenger and/or cargo components. Specifically, a refrigerant having characteristics (such as combustibility or an explosive nature) unsuitable for use where it might come in contact with humans or perishable comestibles may be employed without fear of such contact occurring within the compartments as a result of leakage. And the fact that refrigerant charge volume is reduces, minimizes the hazard posed by such characteristics even in the location where such a refrigerant is present.

Finally, because the evaporator is a refrigerant/liquid evaporator as opposed to a conventional refrigerant/air evaporator, the inefficiencies associated with the presence of condensate on air side surfaces in conventional refrigerant/air evaporators are avoided or minimized.

We claim:

1. In a vehicle having an engine compartment containing an engine for vehicle propulsion purposes and at least one passenger or cargo compartment, a refrigeration system using a refrigerant selected from the group consisting of CFCs, HCFCs, HFCs and HCs including the combination of:

a compressor in said engine compartment;

a condenser in close proximity to said compressor having a condenser refrigerant flow path and a condenser liquid flow path in heat exchange relation therewith;

an evaporator within said engine compartment in close proximity to both said compressor and said condenser, said evaporator having an evaporator refrigerant flow path and an evaporator liquid flow path in heat exchange relation therewith;

at least one fitting in fluid communication with said loop; conduit means interconnecting said compressor and said refrigerant flow paths to define a refrigerant loop;

the proximity of said compressor and said condenser and evaporator refrigerant flow paths being such as to minimize the volume of refrigerant in said conduit means so that in the event of refrigerant leakage through said refrigerant flow paths, said conduit means on said fitting(s), the discharge of refrigerant to the ambient will be minimized;

a compartment air-liquid heat exchanger operatively associated with said passenger or cargo compartment to cool the same;

circulating means for circulating a liquid cooled in said evaporator liquid flow path to said compartment heat exchanger for cooling said passenger or cargo compartment;

a condenser cooling air-liquid heat exchanger on the vehicle and exposed to the ambient to be cooled thereby;

circulating means for circulating a liquid cooled in said condenser cooling heat exchanger to said condenser liquid flow path for cooling said condenser;

an exothermic mechanical device;

an auxiliary heat exchanger to cool said mechanical device; and a circulating means including means for selectively connecting said evaporator liquid flow path to said auxiliary heat exchanger to cool said mechanical device.

2. In a vehicle having an engine compartment and at least one passenger or cargo compartment, a refrigeration system employing a refrigerant selected from the group consisting of CFCs, HFCs, HCFCs and HCs including:

- a compressor adapted to be powered by a vehicle power system;
- a condenser in close proximity to said compressor having a condenser refrigerant flow path and a condenser liquid flow path in heat exchange relation therewith;
- a refrigerant/liquid evaporator in close proximity to both said compressor and said condenser, said evaporator having an evaporator refrigerant flow path and an evaporator liquid flow path in heat exchange relation with each other;
- means interconnecting said compressor and said refrigerant flow paths to define a refrigerant loop;
- at least on fitting in fluid communication with said loop;
- the proximity of said compressor and said condenser, and said evaporator being such as to minimize the volume of refrigerant in said conduit means so that in the event of refrigerant leakage through said flow paths, said connecting means or said fittings(s), the discharge of refrigerant to the ambient will be minimized;
- said compressor, said condenser and said evaporator being remote from said passenger or cargo compartment;
- an air-liquid compartment heat exchanger including a fluid flow path in heat exchange relation with a compartment air flow path to said passenger or cargo compartment to cool the same;
- circulating means for circulating a liquid cooled in said evaporator liquid flow path to said compartment heat exchanger in heat exchange relation with said air flow path to provide for cooling said passenger or cargo compartment;
- a condenser cooling heat exchanger including a fluid flow path in heat exchange relation with said condenser to cool the same;
- circulating means for circulating a liquid cooled in a condenser liquid flow path to said condenser cooling heat exchanger for cooling said condenser;
- an exothermic mechanical device;
- an auxiliary heat exchanger to cool said mechanical device; and
- a circulating means including means for selectively connecting said evaporator liquid flow path to said auxiliary heat exchanger to cool said mechanical device.

* * * * *